(12) United States Patent
Vassilakakis

(10) Patent No.: US 11,945,569 B2
(45) Date of Patent: Apr. 2, 2024

(54) HYBRID ANCHOR RAIL FOR AIRCRAFT FLOOR

(71) Applicant: Airbus Operations (S.A.S.), Toulouse (FR)

(72) Inventor: Giuseppe Vassilakakis, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 301 days.

(21) Appl. No.: 17/586,134

(22) Filed: Jan. 27, 2022

(65) Prior Publication Data

US 2022/0242551 A1 Aug. 4, 2022

(30) Foreign Application Priority Data

Jan. 29, 2021 (FR) ...................................... 2100860

(51) Int. Cl.
*B64C 1/20* (2006.01)
*B64D 11/06* (2006.01)
*C23C 30/00* (2006.01)
*C23F 11/18* (2006.01)

(52) U.S. Cl.
CPC ............ *B64C 1/20* (2013.01); *B64D 11/0696* (2013.01); *C23C 30/00* (2013.01); *C23F 11/185* (2013.01)

(58) Field of Classification Search
CPC ......... B64C 1/20; B64C 1/18; B64D 11/0696; B64D 9/003
See application file for complete search history.

(56) References Cited

U.S. PATENT DOCUMENTS

| | | | |
|---|---|---|---|
| 7,229,700 B2 * | 6/2007 | Ruggiero | C23C 4/06 428/595 |
| 9,879,355 B2 * | 1/2018 | Bares | C25D 11/08 |
| 2006/0088725 A1 | 4/2006 | Ruggiero et al. | |
| 2006/0292392 A1 * | 12/2006 | Froning | B32B 15/00 427/446 |
| 2016/0047057 A1 * | 2/2016 | Bares | C25D 11/246 205/106 |
| 2022/0033054 A1 * | 2/2022 | Fangmeier | C25D 11/18 |

FOREIGN PATENT DOCUMENTS

| | | |
|---|---|---|
| DE | 10 2015 100189 A1 | 7/2016 |
| FR | 3 089 948 A1 | 6/2020 |
| WO | WO 2010/097221 A1 | 9/2010 |

OTHER PUBLICATIONS

French Search Report for Application No. 2100860 dated Oct. 12, 2021.
European Office Action for U.S. Appl. No. 22/153,577 dated Jun. 9, 2022.

* cited by examiner

*Primary Examiner* — Rodney Mintz
(74) *Attorney, Agent, or Firm* — KDW Firm PLLC

(57) ABSTRACT

An anchor rail for an aircraft floor includes an upper flange with a guideway and two flange wings. The rail is formed of a beam and of an anti-corrosion protection. The beam is formed at least of a body made from a first material and defining the lower stiffening structure and an upper platform. The anti-corrosion protection wholly covers an upper face of the upper platform and therewith constitutes the upper flange of the rail, thus layered. The anti-corrosion protection is at least formed of a protective sheet made of a second material more resistant to corrosion than the first material and selected from a metal and a fiber-reinforced plastic composite material. Such a rail exhibits good corrosion resistance for modest cost.

10 Claims, 10 Drawing Sheets

HYBRID ANCHOR RAIL FOR AIRCRAFT FLOOR

CROSS-REFERENCE TO RELATED APPLICATION

This application claims priority to French patent application number 2100860 filed on Jan. 29, 2021, the entire disclosure of which is incorporated by reference herein.

TECHNICAL FIELD

The disclosure herein relates to an anchor rail for an aircraft floor, of the type comprising an upper flange comprising a guideway intended for anchoring elements such as seats or freight containers, and two flange wings arranged one on each side of the guideway and intended to support floor panels, and further comprising a lower stiffening structure connected to the upper flange.

BACKGROUND

In aircraft, the anchor rails intended to be integrated into the floors are subjected to phenomena of corrosion because of the presence of air and moisture in their surroundings.

It is known practice to protect such rails against corrosion by coating the rails with a layer of silicone, a material that is soft and easily scratched, or by a coat of paint, which by nature is very thin (typically around 100 microns). In both instances, the protection offered against corrosion therefore proves to be limited in time.

It is also known practice to use a material with good corrosion resistance as a material from which to make such rails. This solution, however, comes at a considerable cost.

SUMMARY

An object of the disclosure herein is an anchor rail of the above type which offers good resistance to corrosion that is durable over time, while at the same time being of limited cost.

To that end, the disclosure herein proposes an anchor rail for an aircraft floor, comprising:
  an upper flange comprising a guideway intended for anchoring fixing elements, and two flange wings arranged one on each side of the guideway and intended to support floor panels, and
  a lower stiffening structure connected to the upper flange.
  According to the disclosure herein, the anchor rail is formed:
  of a beam formed at least of a body made of a first material and defining the lower stiffening structure and an upper platform; and
  of an anti-corrosion protection wholly covering an upper face of the upper platform so that the anti-corrosion protection and the upper platform together constitute the upper flange of the rail, the anti-corrosion protection being at least formed of a protective sheet made of a second material more resistant to corrosion than the first material and extending continuously from one lateral free end of one of the flange wings as far as a lateral free end of the other flange wing and by which the protective sheet covers a bottom and two mutually opposite side walls of the guideway.

The configuration of the anti-corrosion protection allows effective and durable protection of the rail against corrosion while at the same time making it possible to limit the overall cost of the rail.

In some embodiments of the disclosure herein, the first material is aluminum or an aluminum alloy and/or the second material is selected from titanium or a titanium alloy, and a stainless steel.

In some embodiments of the disclosure herein, the upper platform of the beam and the anti-corrosion protection have at least a pair of aligned respective orifices together defining a through-passage extending through the upper flange of the rail for a fastener.

In some embodiments of the disclosure herein, the rail comprises an anti-corrosion protection bushing housed at least in the orifice of the upper platform of the beam and delimiting at least a segment of the through-passage.

In some embodiments of the disclosure herein, the anti-corrosion protection bushing is set into the upper platform and covered by part of the anti-corrosion protection that forms a periphery of the orifice of the anti-corrosion protection.

As a variant, the anti-corrosion protection bushing may extend through the anti-corrosion protection.

In some embodiments of the disclosure herein, the beam further comprises an anti-corrosion coating which covers the entirety of the body of the beam, and by which the anti-corrosion coating is interposed between the body of the beam and the anti-corrosion protection at the upper flange.

In some embodiments of the disclosure herein, the anti-corrosion protection further comprises a tack coat layer interposed between at least part of the protective sheet and at least part of the upper platform of the beam.

The tack coat layer is advantageously formed of at least one of: a mastic, an adhesive, and a double-sided sticky tape.

In some embodiments of the disclosure herein, at least a lateral edge of the upper platform of the beam is protected against the ingress of corrosive fluids between the upper platform and the anti-corrosion protection layer by a sealant arranged:
  either in a space formed between the anti-corrosion protection and the upper platform, as a result of the lateral edge forming a rounded portion at a junction between the upper face of the platform and a corresponding edge face of the platform, or forming a rounded portion over the entirety of an edge face of the platform;
  or in the form of a deposit of material added to a flat edge face formed jointly by the lateral edge of the upper platform and a corresponding lateral edge of the anti-corrosion protection;
  or in the form of a deposit of material which is added to a flat edge face formed at least by the lateral edge of the upper platform and which extends as far as an underside face of a lateral edge of the protective sheet of the anti-corrosion protection which extends as an overhang beyond the flat edge face.

In some embodiments of the disclosure herein, the upper platform has at least one lateral edge forming a rounded portion at a junction between the upper face of the platform and a corresponding edge face of the platform, the rounded portion being covered by a turned-over edge of the anti-corrosion protection layer.

In some embodiments of the disclosure herein, the bottom and the side walls of the guideway are set back towards a lower side of the rail with respect to the flange wings of the flange.

In a variant, the side walls of the guideway may be arranged so that they project towards an upper side of the rail with respect to the flange wings of the flange.

The disclosure herein also relates to an aircraft floor comprising panels and at least one rail of the type described hereinabove of which the flange wings of the upper flange support the panels.

The disclosure herein also relates to an aircraft comprising at least one floor of the type described hereinabove, and at least one fixing element anchored in the guideway of the rail.

The disclosure herein also relates to a method for manufacturing an anchor rail for an aircraft floor of the type described hereinabove, comprising at least the following steps:
- A) procuring the beam, formed at least of the body made of the first material and defining the lower stiffening structure and the upper platform, or procuring a quantity of the first material suitable for subsequent production of the beam;
- B) procuring the protective sheet made of the second material more resistant to corrosion than the first material; then
- C) creating the flange by the protective sheet and of the beam or of at least some of the quantity of the first material.

In some embodiments of the disclosure herein, step C comprises at least:
- using a rolling technique, preforming the protective sheet so as to cause it to adopt a shape comprising a middle part delimited laterally by two opposite ridges projecting out towards a first side with respect to the middle part and extended respectively by two terminal blades facing one another and extending in the direction of a second side opposite to the first side; then
- bending the protective sheet thus prepared so as to bring the terminal blades into a configuration parallel to a central part of the middle part.

In some embodiments of the disclosure herein, step A comprises procuring the beam, and step C comprises:
- applying and fixing the protective sheet to the upper platform, giving the protective sheet a definitive shape using an elastoforming technique or using a hydroforming technique.

In other embodiments of the disclosure herein, step A comprises procuring the quantity of the first material, and step C comprises forming the beam using a metal-working process in which the protective sheet acts as die.

BRIEF DESCRIPTION OF THE DRAWINGS

The disclosure herein will be better understood, and other details, advantages and features thereof will become apparent from reading the following description given by way of nonlimiting example and with reference to the attached drawings in which.

Throughout all these figures, identical references may denote elements that are identical or analogous.

DETAILED DESCRIPTION

Figure 1:
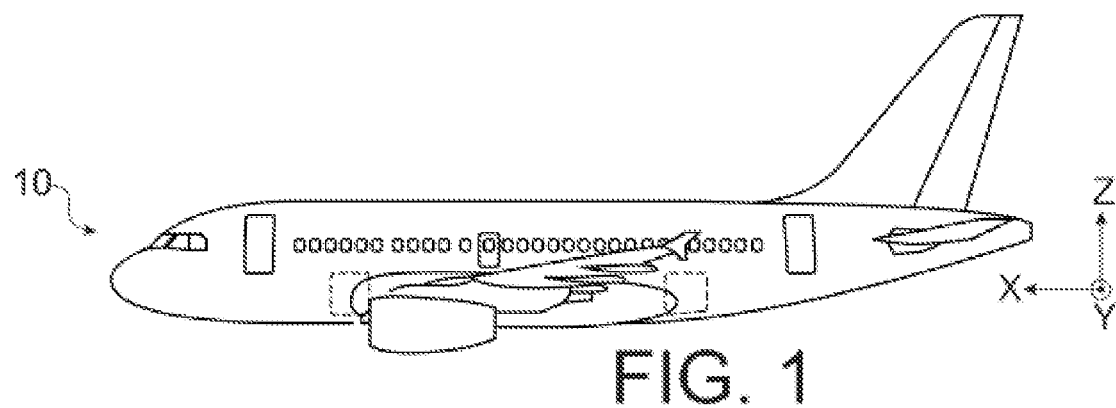
FIG. 1 is a schematic side view of an aircraft.

FIG. 1 illustrates an aircraft 10, for example an airplane of the type intended for the commercial transportation of passengers or of freight, comprising a floor formed of a collection of floor panels resting on a structure formed of a collection of rails and of crossmembers. Some of the rails, known as anchor rails, each have an upper flange provided with a guideway in which fixing elements for fixing seats or freight containers for example are retained, and with two flange wings arranged one on each side of the guideway and on which floor panels rest. These rails furthermore each comprise a lower stiffening structure connected to the upper flange.

In the present description, the vertical direction Z, the sides "upper" and "lower" as well as the directions "top" and "bottom" are defined in a conventional way with reference to the orientation of the aircraft when it is on the ground. The directions X and Y are oriented orthogonally to the vertical direction Z so as to define an orthonormal frame of reference. In particular, the direction X is defined as the longitudinal direction of the rails, and the direction Y is defined as the transverse direction.

Figure 2:
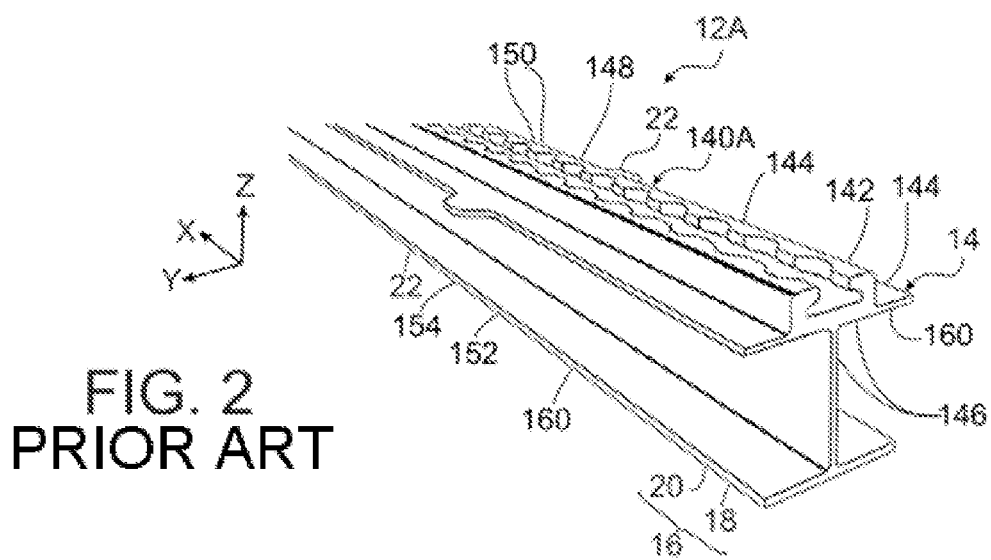
FIG. 2 is a schematic perspective view of an anchor rail of a known type.
Figure 3:
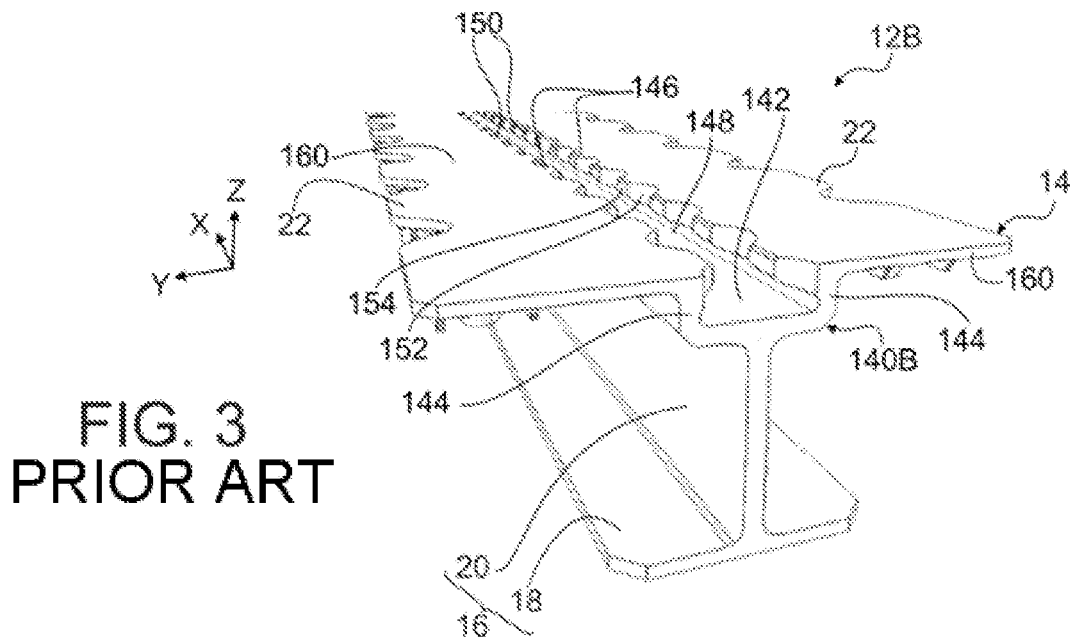
FIG. 3 is a schematic perspective view of an anchor rail of another known type.

FIGS. 2 and 3 respectively illustrate anchor rails 12A, 12B according to two known configurations. These figures show the upper flange 14 and the lower stiffening structure 16 of each of the rails 12A and 12B.

These two figures thus show the guideway 140A, 140B of each of the rails, which in each instance has a bottom 142 and two mutually opposed side walls 144 projecting upwards from the bottom 142. The two side walls 144 have respective free ends curving towards one another to form retaining lips 146 which are separated from one another to leave an opening 148 of the guideway between respective edges 150 of the retaining lips 146. The opening 148 of the guideway thus has a cross section that is narrower than a maximum internal cross section of the guideway as defined between the opening 148 and the bottom 142, so as to provide retention for fixing elements for fixing seats or freight containers or the like (not depicted in the figures) in the guideway through the effect of abutment against the retaining lips 146. In addition, the edges 150 of the lips 148 advantageously exhibit an alternation of teeth 152 and of concave notches 154 intended to retain the fixing elements in the longitudinal direction of the guideway in a way known per se.

FIGS. 2 and 3 further show the two flange wings 160 arranged one on each side of the guideway to support floor panels.

In the case of the rail illustrated in FIG. 2, the guideway 140A projects in the sense that at least the side walls 144 of the guideway 140A are arranged so that they project towards the upper side of the rail, in relation to the flange wings 160 of the flange 14. In the example illustrated, the bottom 142 of the guideway is itself likewise offset towards the upper side, with respect to the flange wings 160.

By contrast, in the case of the rail illustrated in FIG. 3, the guideway 140B is formed set back, insofar as the bottom 142 and the side walls 144 of the guideway are offset towards a lower side of the rail in comparison with the flange wings 160 of the flange 14.

Furthermore, the lower stiffening structure 16 of each of the rails 12A and 12B generally comprises a sole 18 running parallel to the upper flange 14 and a web 20 running orthogonally to the upper flange 14 and to the sole 18 and connecting these two elements together.

In addition, each of the rails 12A and 12B typically comprises lugs 22 extending laterally as a projection from the flange wings 160 of the upper flange 14 to accept fasteners for securing floor panels.

Such anchor rails are usually made of aluminum covered with an anti-corrosion coating in the form of a fine coat of paint or a thick coat of relatively soft silicone. Such a coating does however prove to be relatively fragile, and in particular easily scratched, and therefore has an effectiveness that is limited over time, which means that significant costs are occasioned by the need to regularly replace such rails.

In order to overcome this problem, it has been proposed for such rails to be made of titanium in order to increase their resistance to corrosion. However, such a change in material entails a considerable additional cost.

The disclosure herein which will now be described proposes a solution providing good corrosion resistance while at the same time limiting costs.

In its broadest aspect, with reference to FIG. 4, the disclosure herein proposes a rail 12 having, like the rails described hereinabove, an upper flange 14 comprising a guideway 140B intended for the fixing of elements such as seats, containers or the like, and two flange wings 160 arranged one on each side of the guideway and intended to support floor panels, and a lower stiffening structure 16 connected to the upper flange 14.

Figure 4:
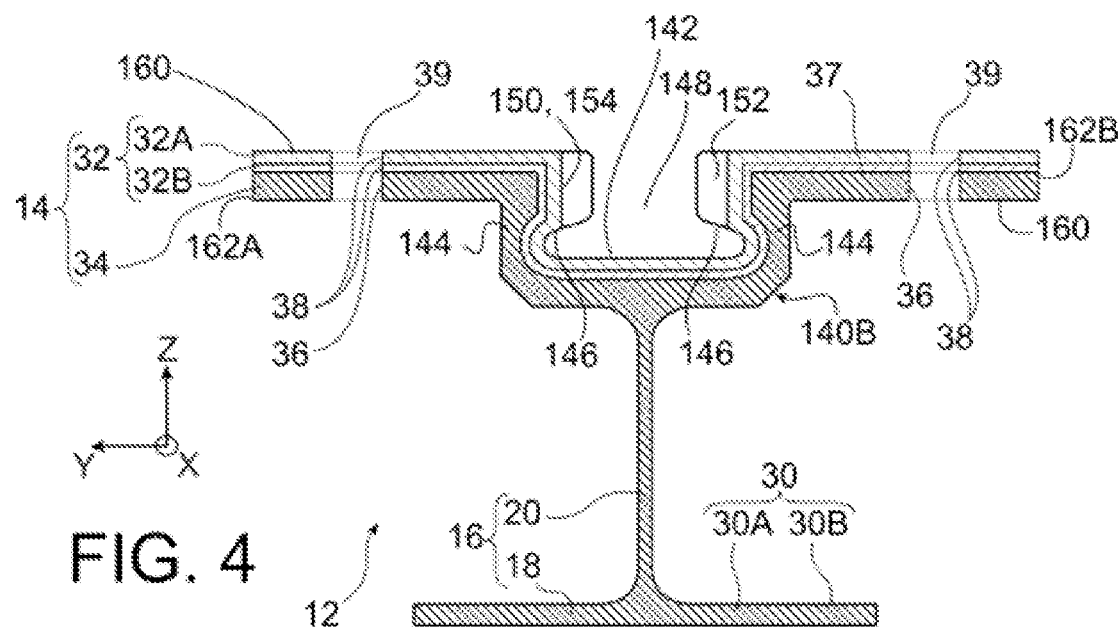
FIG. 4 is a schematic view in cross section of an anchor rail according to the disclosure herein.

Such a rail may have a set-back guideway, namely be a rail of the type illustrated in FIG. 3, and corresponding to the example shown in FIG. 4, or such a rail may have a protruding guideway, namely be a rail of the type illustrated in FIG. 2.

According to the disclosure herein, such a rail 12 is formed of a beam 30 and of an anti-corrosion protection 32 which are such that:

the beam 30 defines the lower stiffening structure 16 and an upper platform 34 connected to the lower stiffening structure 16;

the beam 30 is formed at least of a body 30A made from a first material and defining the lower stiffening structure 16 and the upper platform 34;

the anti-corrosion protection 32 wholly covers an upper face 37 of the upper platform 34 so that the anti-corrosion protection 32 and the upper platform 34 together constitute the upper flange 14 of the rail;

the anti-corrosion protection 32 is at least formed of a protective sheet 32A made from a second material more resistant to corrosion than the first material, and extending continuously from one lateral free end 162A of one of the flange wings 160 as far as a lateral free end 162B of the other flange wing 160 and by which the protective sheet 32A covers in particular the bottom 142 and the two side walls 144 of the guideway.

This layered configuration of the upper flange 14, comprising at least the upper platform 34 and the protective sheet 32A in a superposed state, affords the anchor rail 12 effective protection against corrosion while at the same time allowing the beam 30 to be made of a material that has a limited cost. Indeed, what should be understood by "protective sheet" is a relatively hard and rigid solid element that has been placed on the upper platform 34, unlike the anti-corrosion coatings of the prior art which are formed of silicone or of paint and which are obtained by being applied in the form of flexible strip(s) or in the form of fluid to the rail, such coatings having the disadvantage of being soft, in the case of silicone, or very thin, in the case of paint, as explained above.

The first material, from which the body 30A of the beam is made, is typically aluminum or an aluminum alloy.

The second material, from which the protective sheet 32A of the anti-corrosion protection 32 is made, is advantageously made of a metal that is more "noble", which is to say more resistant to corrosion, than the first material, for example of titanium or of a titanium alloy, or a stainless steel.

Because of the use of two different materials, the corrosion-resistance and cost properties of which are exploited to the full, such a rail can be termed a "hybrid rail".

The protective sheet 32A preferably has a thickness greater than 0.2 mm, more preferentially greater than 0.3 mm, and more preferably still, greater than 0.4 mm.

In some embodiments of the disclosure herein, with reference to FIG. 4, the beam 30 further comprises an anti-corrosion coating 30B which covers the entirety of the body 30A of the beam. The anti-corrosion coating 30B may, in one embodiment, be achieved by surface treatment, and by way of illustration, the surface coating includes anodizing and the application of an anti-corrosion paint.

The anodizing is, for example, of the tartaric sulfuric acid or else of the sulfuric type (using a bath of sulfuric acid). The application of the anti-corrosion paint may be preceded by the application of a primer and followed by a finish coat layer. So far as the upper flange 14 is concerned, it must therefore be appreciated that, in such instances, the anti-corrosion coating 30B is interposed between the body 30A of the beam and the anti-corrosion protection 32. In such instances, the beam 30, formed of the body 30A and of the anti-corrosion coating 30B, can therefore be likened to a rail of known type.

In addition, in some embodiments of the disclosure herein, still with reference to FIG. 4, the anti-corrosion protection 32 may further comprise a tack coat layer 32B interposed between at least part of the protective sheet 32A and at least part of the upper platform 34 of the beam 30. The tack coat layer 32B is therefore in contact with the anti-corrosion coating 30B or, in embodiments that do not have such a coating, in contact with the body 30A of the beam.

The tack coat layer 32B ensures adhesion of the protective sheet 32A to the upper platform 34 and for this purpose is advantageously formed of a mastic and/or of an adhesive and/or of a double-sided sticky tape.

In preferred embodiments like those that will be described hereinafter with reference to FIGS. 5 and 6, the tack coat layer 32B is present only at the flange wings 160 and is absent from the guideway 140A or 140B. In other words, the protective sheet 32A in such instances is directly in contact with the part of the upper platform 34 of the beam 30 that defines the guideway.

Figure 4A:
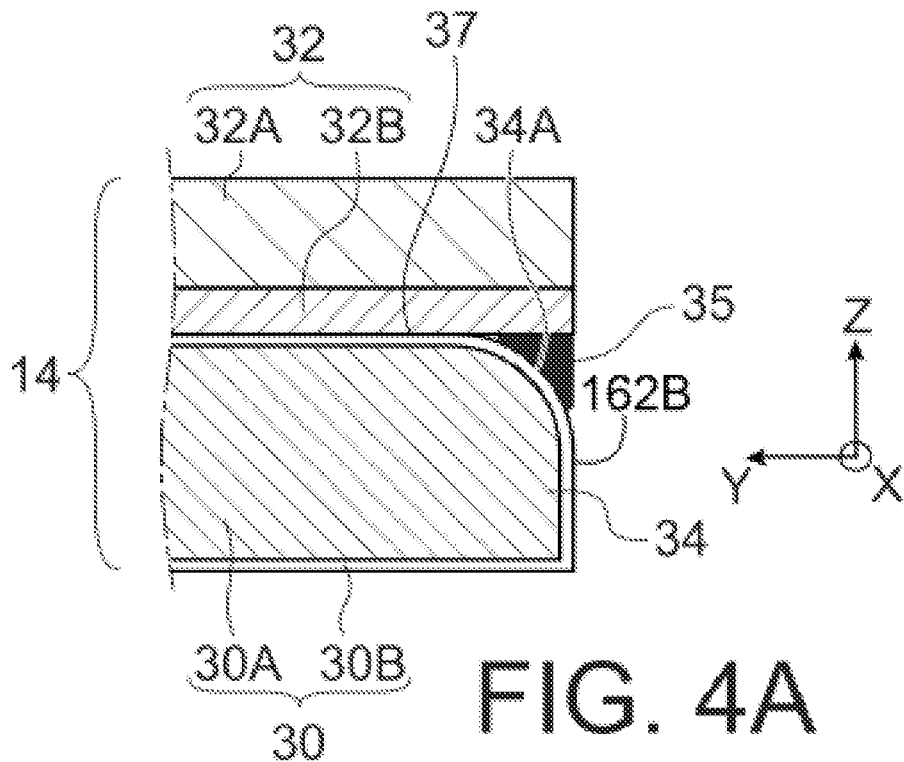
FIG. 4A is a view on a larger scale of part of FIG. 4.
Figure 4B:
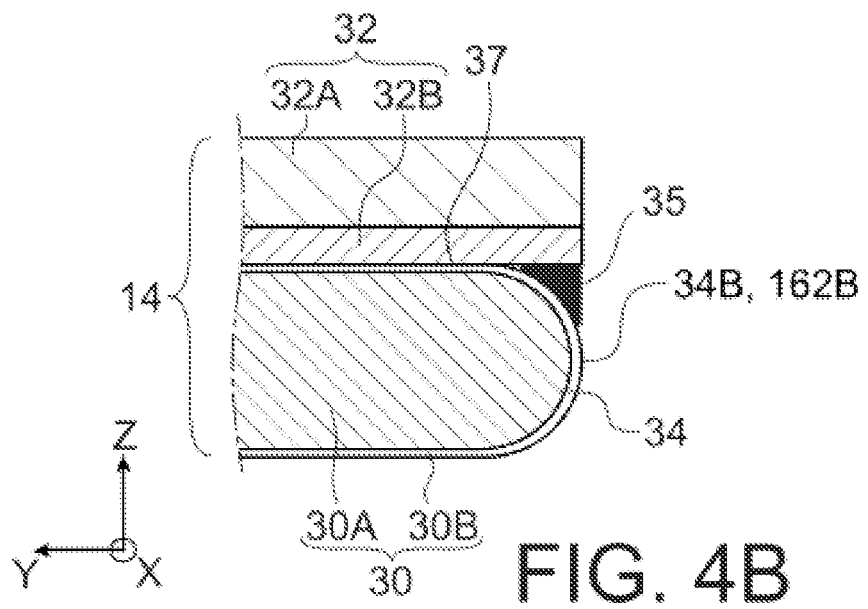
FIG. 4B is a view similar to FIG. 4A illustrating a variant embodiment of the disclosure herein.
Figure 4C:
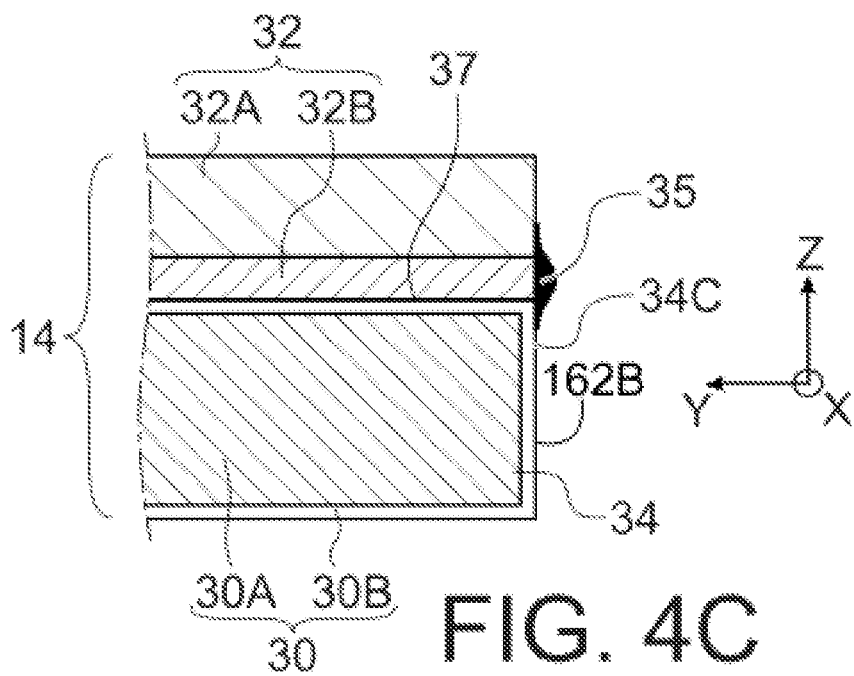
FIG. 4C is a view similar to FIG. 4A illustrating another variant embodiment of the disclosure herein.

Moreover, each lateral edge of the upper platform 34 of the beam 30 is advantageously protected, notably against the ingress of corrosive fluids between the upper platform 34 and the anti-corrosion protection layer 32, by a sealant 35, such as a mastic or an adhesive, arranged:

either in a space formed between the anti-corrosion protection 32 and the upper platform 34, as a result of the lateral edge in question forming a rounded portion 34A at the junction with the upper face of the platform (FIG. 4A) or forming a rounded portion 34B over the entirety of the edge face of the platform (FIG. 4B);

or in the form of a deposit of material (FIG. 4C) added to a flat edge face 34C formed jointly by the lateral edge in question of the upper platform 34 and a corresponding lateral edge of the anti-corrosion protection 32;

or in the form of a deposit of material (FIG. 4D) which is added to a flat edge face 34D formed by the lateral edge of the upper platform 34, and where appropriate, by the tack coat layer 32B of the anti-corrosion protection 32, and which extends as far as an underside face of a lateral edge 33 of the protective sheet 32A of the anti-corrosion protection 32 which extends as an overhang beyond the flat edge face 34D.

As a variant (FIG. 4E), the upper platform 34 may have one or more lateral edges each forming a rounded portion 34A at a junction between the upper face 37 of the platform and the corresponding edge face thereof, the rounded portions 34A being covered by turned-over edges 32F of the anti-corrosion protection layer 32.

In some embodiments of the disclosure herein, with reference to FIG. 4, the upper platform 34 of the beam 30 and the anti-corrosion protection 32 have one or more pairs of respective aligned orifices 36, 38 situated within the flange wings 160. Two pairs of orifices of this type are thus visible in FIG. 4. Kept together, the orifices 36, 38 of each pair define a through-passage 39 in the upper flange 14 of the rail 12, allowing the passage of a fastener (not visible in FIG. 4) intended, for example, for securing floor panels to the rail 12 as will become more clearly apparent in what follows, or intended for securing fittings to a floor comprising the rail 12.

Figure 4D:
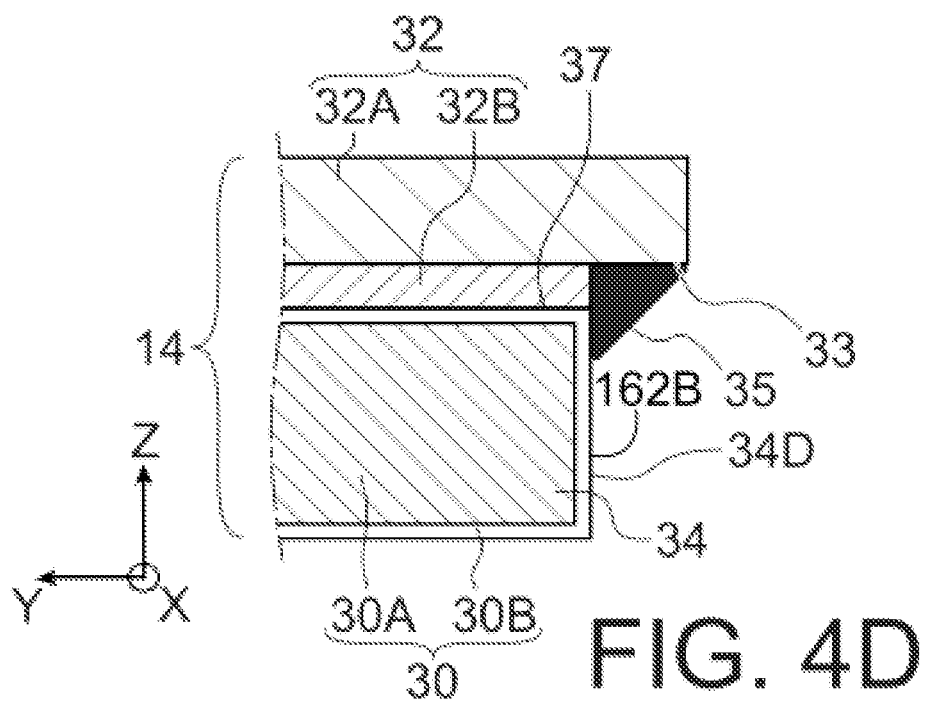
FIG. 4D is a view similar to FIG. 4A illustrating yet another variant embodiment of the disclosure herein.
Figure 4E:
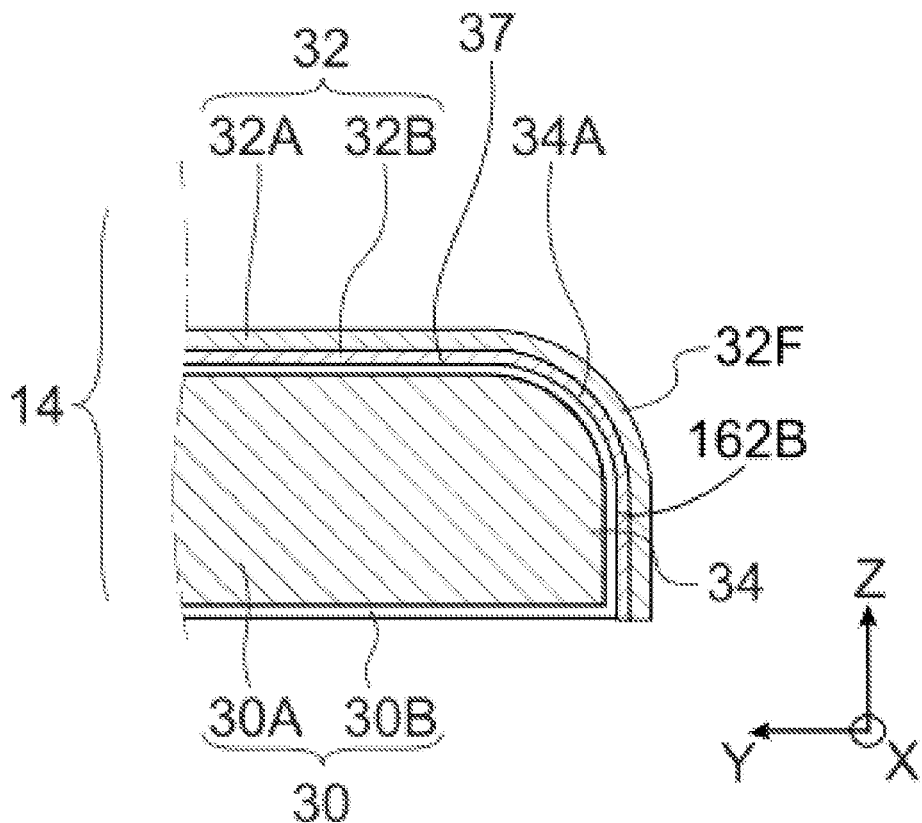
FIG. 4E is a view similar to FIG. 4A illustrating yet another variant embodiment of the disclosure herein.
Figure 4F:
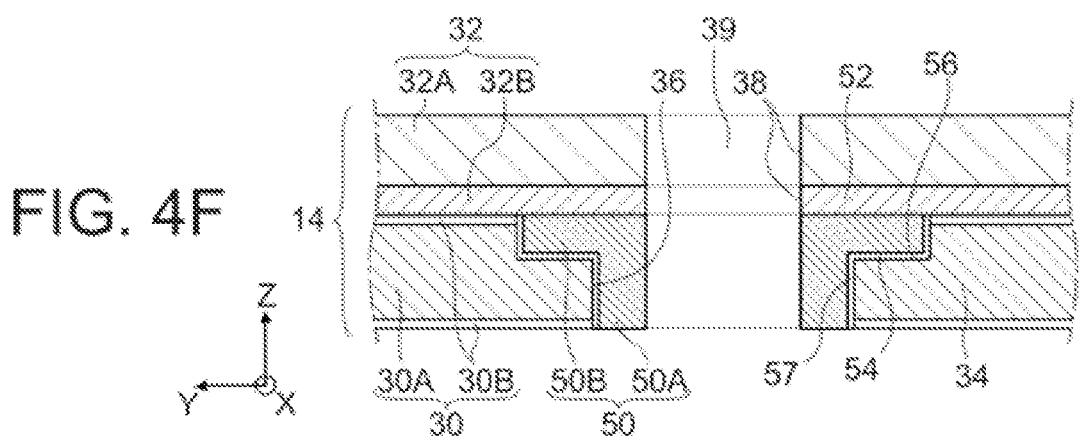
FIG. 4F is a view on a larger scale of another part of FIG. 4.
Figure 4G:
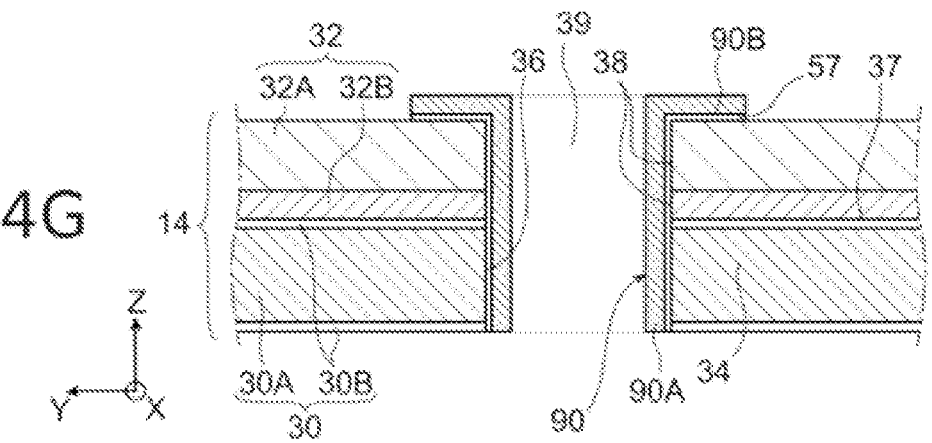
FIG. 4G is a view similar to FIG. 4F illustrating a variant embodiment of the disclosure herein.

With reference to FIGS. 4F and 4G, for each of the pairs of orifices 36, 38, at least one segment of the through-passage 39, corresponding to the orifice 36 in the upper platform 34, is advantageously delimited by an anti-corrosion protection bushing housed in the orifice 36 and preventing the first material of which the upper platform 34 is made from being exposed to corrosion at the internal surface of such an orifice.

More particularly, FIG. 4F illustrates a configuration, referred to as the inset bushing configuration, in which such an anti-corrosion protection bushing, referenced 50, is inset into the upper platform 34 and covered by a part 52 of the anti-corrosion protection 32 forming a periphery of the corresponding orifice 38 of the anti-corrosion protection. In such an instance, the anti-corrosion protection bushing 50 preferably has a lower portion 50A in the shape of a cylinder of revolution, and an upper rim 50B, for example of annular shape, projecting laterally with respect to the lower portion 50A and defining a shoulder 54 between the lower portion 50A and the upper rim 50B. In addition, the upper platform 34 of the beam 30 has, around the corresponding orifice 36, a counterbore 56 on which the shoulder 54 bears. Such a configuration provides retention for the anti-corrosion protection bushing 50 in the corresponding orifice 36 even when there is no fastener in the corresponding through-passage 39.

FIG. 4G shows another configuration, referred to as the protruding bushing configuration, in which the anti-corrosion protection bushing, referenced 90, comprises a lower portion 90A, for example in the form of a cylinder of revolution, which extends through the anti-corrosion protection 32, and an upper rim 90B pressed against the anti-corrosion protection 32.

In general, such an anti-corrosion protection bushing 50, 90 is made from a material that is more resistant to corrosion than the first material, preferably from a metallic material, for example titanium or a titanium alloy. The anti-corrosion protection bushing may, alternatively, be made of polytetrafluoroethylene (PTFE) or any other appropriate material.

Furthermore, mastic 57 (visible only in the larger-scale views of FIGS. 4F and 4G) is advantageously interposed between such a bushing and the upper platform 34 of the beam 30, in the case of an inset bushing configuration, or between the bushing and the assembly of the upper flange 14, in the case of a protruding bushing configuration. The interposition of the mastic makes it possible, where appropriate, to avoid the phenomena of galvanic coupling between the anti-corrosion protection bushing 50, 90 and the upper platform 34.

Figure 5:
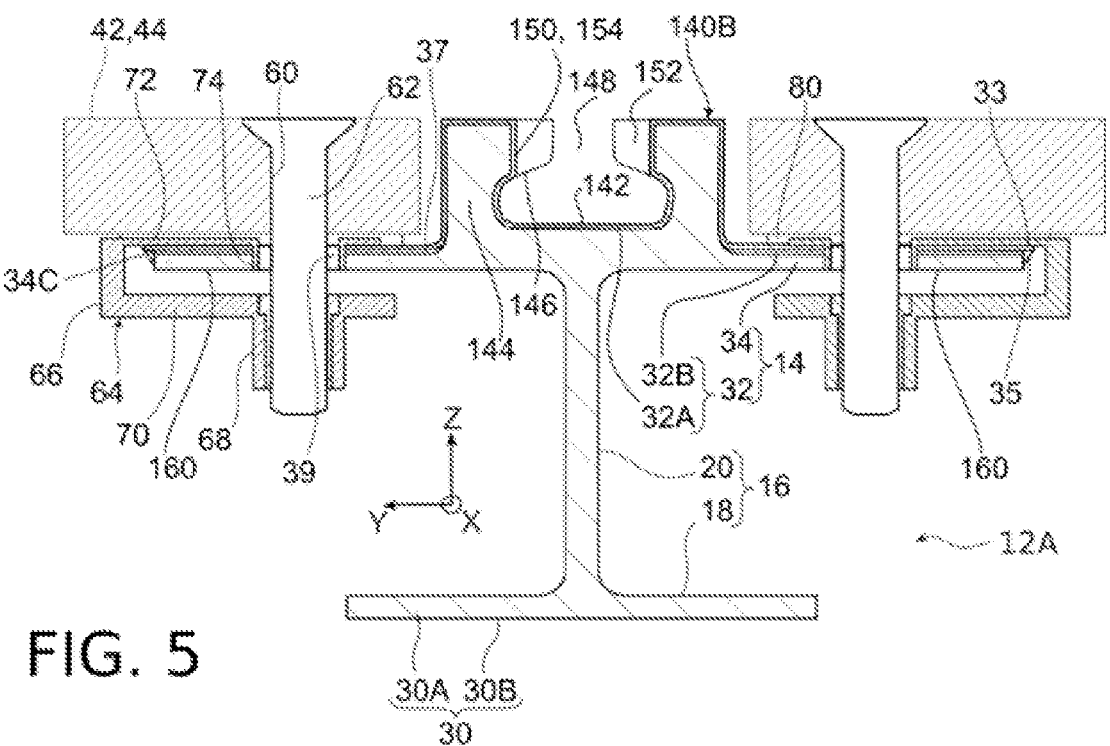
FIG. 5 is a partial schematic view in cross section of an aircraft floor according to a first embodiment of the disclosure herein, notably illustrating an anchor rail of a first type.
Figure 6:
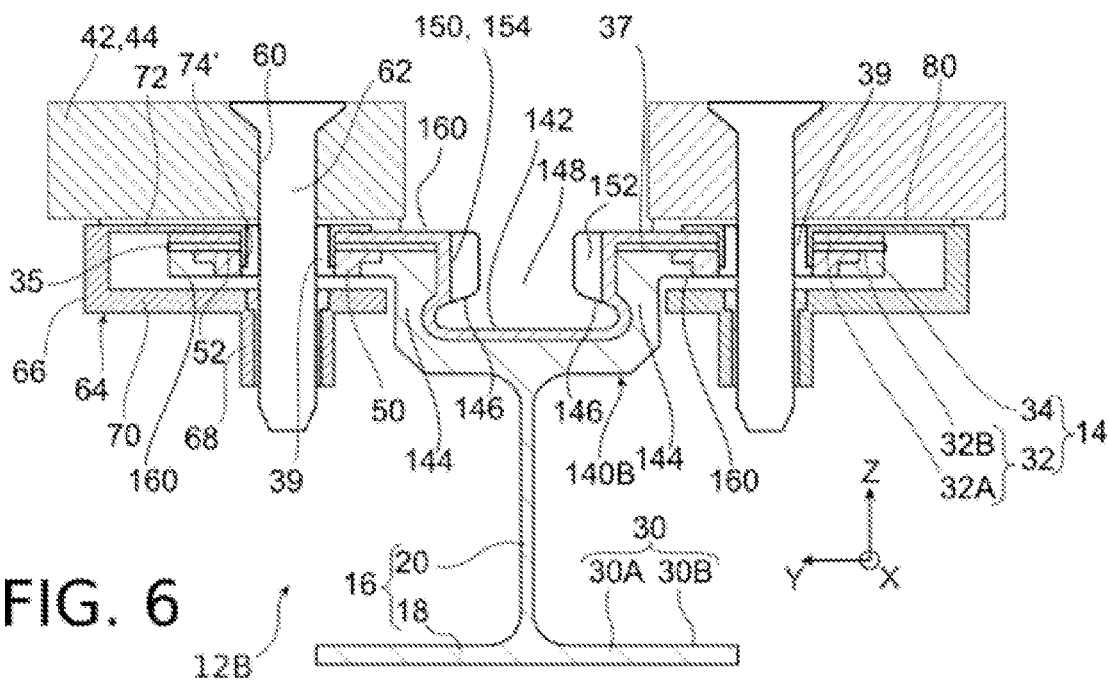
FIG. 6 is a partial schematic view in cross section of an aircraft floor according to a second embodiment of the disclosure herein, notably illustrating an anchor rail of a second type.
Figure 7:
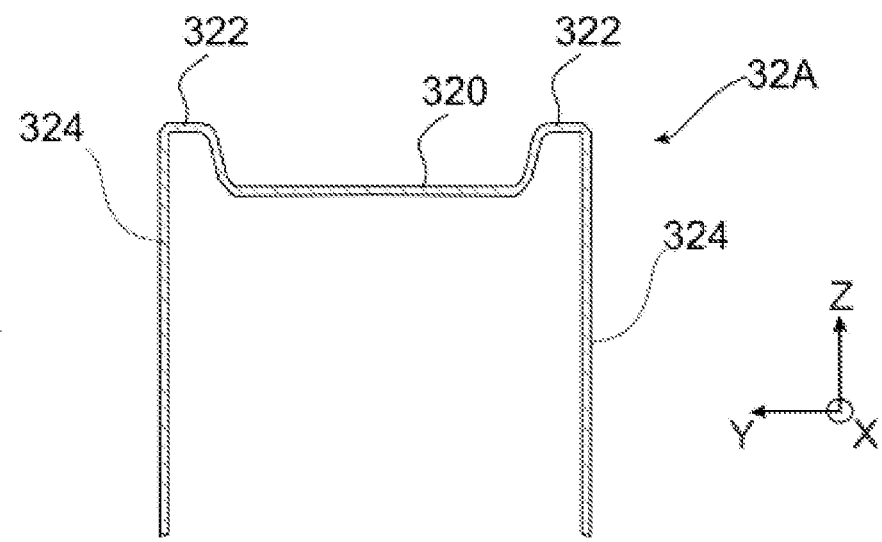
FIG. 7 illustrates one step in a method for manufacturing an anchor rail for an aircraft floor according to a preferred embodiment of the disclosure herein.
Figure 8:
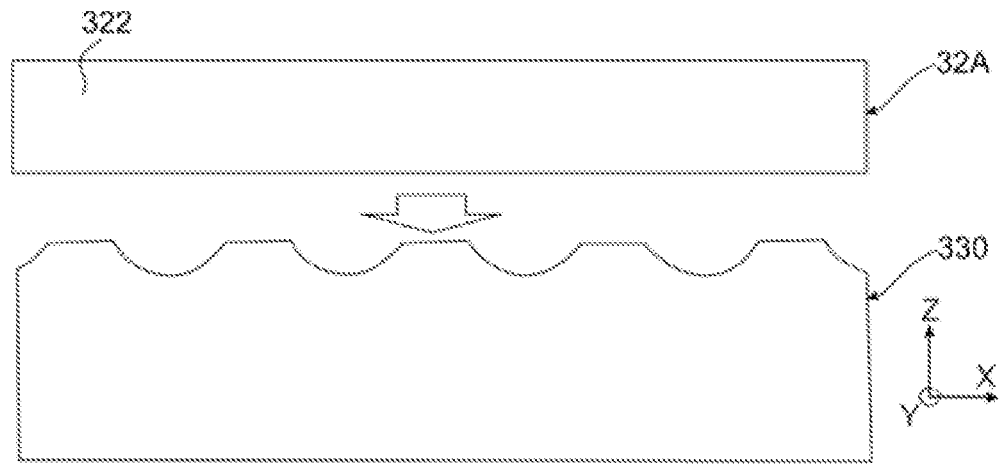
FIG. 8 illustrates a subsequent step in the manufacturing method.
Figure 9:
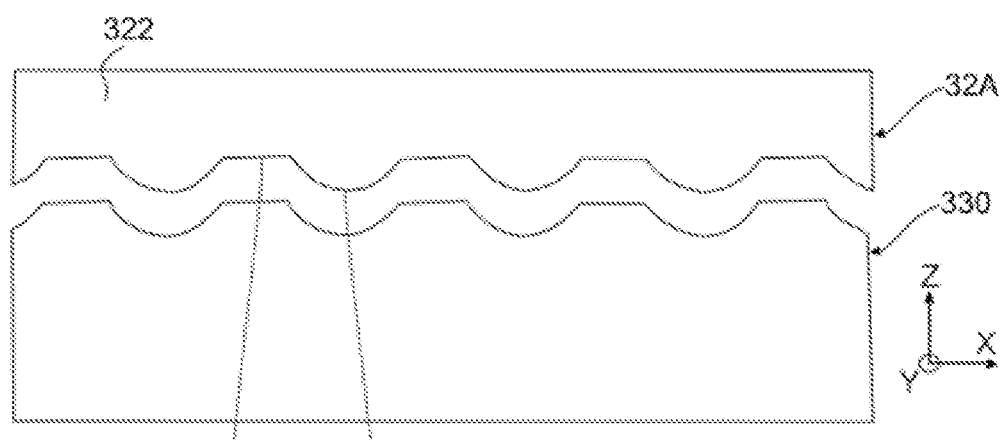
FIG. 9 illustrates a subsequent step in the manufacturing method.
Figure 10:
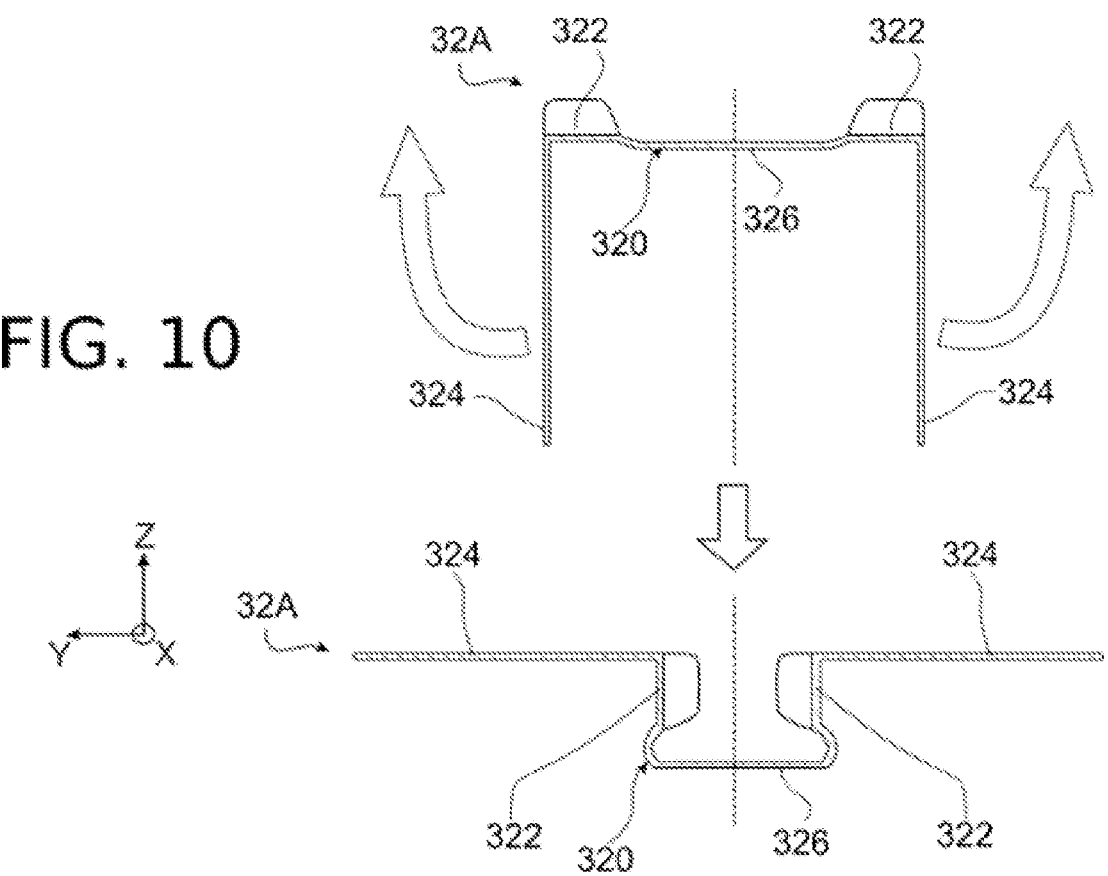
FIG. 10 illustrates a subsequent step in the manufacturing method.

FIGS. 5 and 6 illustrate the use of anchor rails according to the disclosure herein within an aircraft floor.

FIG. 5 illustrates part of a floor 40 comprising at least one anchor rail 12A of the protruding guideway type and floor panels 44, according to an embodiment of the disclosure herein.

The floor panels 44 have through-orifices 60 (of which two are visible in FIG. 5) which are respectively aligned with through-passages 39 in the upper flange 14 of the rail 12A and through which fixing screws, such as floor screws 62, respectively pass to fix the floor panels 44 to the upper flange 14.

In embodiments of the disclosure herein like that of FIG. 5, the floor 42 comprises, for each floor screw 62, a clipped-on suspended nut 64, also known as a "clip nut". Such a nut 64 comprises a clip 66 configured to grip the upper flange 14 and support a nut portion 68 into which the corresponding floor screw 62 is screwed.

To this end, the clip 66 has a C-shaped overall cross section defining a lower tab 70 arranged under- the upper flange 14 and bearing the nut portion 68 which extends downwards from an underside face of the lower tab 70, and an upper tab 72 arranged on the upper flange 14 and bearing a central bushing 74 extending downwards from the upper tab 72 and engaged in the corresponding through-passage 39. The central bushing 74 extends from one end of the through-passage 39 in the upper flange 14 to the other and thus constitutes one example of a protruding anti-corrosion protection bushing.

Moreover, each lateral edge of the upper platform 34 of the beam 30 is protected by an application of sealant 35 in the way illustrated in FIG. 4D.

By way of example, a filling strip 80, for example made of a self-adhesive silicone foam, is also arranged over a region of the upper flange 14 that is not occupied by the upper tabs 72 of the nuts 64 and for example also over the tops of the upper tabs 72, so as to level the floor panels. In a variant or in addition, the floor panels 44 are able to deform in order to conform more or less to the relief created by the upper tabs 72 on the upper flange 14.

Moreover, in a variant, instead of the nut portion 68 being borne by a clip clamping the upper flange 14, the nut portion 68 may be borne by a bushing forcibly introduced from beneath into the upper flange 14.

FIG. 6 illustrates part of a floor 40 comprising at least one anchor rail 12B of the set-back guideway type and floor panels 44, according to another embodiment of the disclosure herein.

In this embodiment, each lateral edge of the upper platform 34 of the beam 30 is for example protected by a sealant 35 applied in the way described above with reference to FIG. 4C.

In addition, each orifice 36 of the upper platform 34 of the beam 30 is delimited by an anti-corrosion protection bushing 50 inset into the upper platform 34 and covered with part of the anti-corrosion protection 32 forming a periphery 52 of the orifice 38 of the anti-corrosion protection, in the same way as in FIG. 4F.

The central bushing 74' for each clip nut 64 extends downwards from the upper tab 72, being engaged in the corresponding through-passage 39, possibly extending as far as into the anti-corrosion protection bushing 50.

In general, a method for manufacturing a rail 12, 12A, 12B for an aircraft floor of the type described hereinabove may comprise the following steps:
A) procuring the beam 30, formed at least of the body 30A made of the first material and defining the lower stiffening structure 16 and the upper platform 34;
B) procuring the protective sheet 32A made of the second material more resistant to corrosion than the first material; then
C) fixing the protective sheet 32A on the upper platform 34 so that the protective sheet 32A covers the entirety of the upper face 37 of the upper platform 34.

Where appropriate, step A comprises, after a substep a1 of procuring the body 30A, a substep a2 of piercing orifices 36 through the upper platform 34 (in this instance, through the part of the body 30A initially constituting the upper platform 34) and, where appropriate, the creation of counterbores 56.

Where appropriate, step A next comprises a substep a3 of anodizing the body 30A then/or a substep a4 of applying the anti-corrosion coating 30B to the body 30A (possibly after the application of a primer thereto).

Where appropriate, step B may comprise, after a substep b1 of procuring the protective sheet 32A, a substep b2 of piercing orifices 38 through the protective sheet 32A.

Step C comprises, for example, a substep c1 of applying the tack coat layer 32B to the upper platform 34, in the form of a fluid in instances in which this tack coat layer is formed of mastic or of adhesive, or in solid form in instances in which this tack coat layer is formed of double-sided sticky tape.

In this case, step C next comprises a substep c2 the purpose of which is to install and fix the protective sheet 32A on the tack coat layer 32B.

In a variant, substep c1 may be omitted, in which case substep c2 has the purpose of installing and fixing the protective sheet 32A directly on the platform 34.

Figure 11:
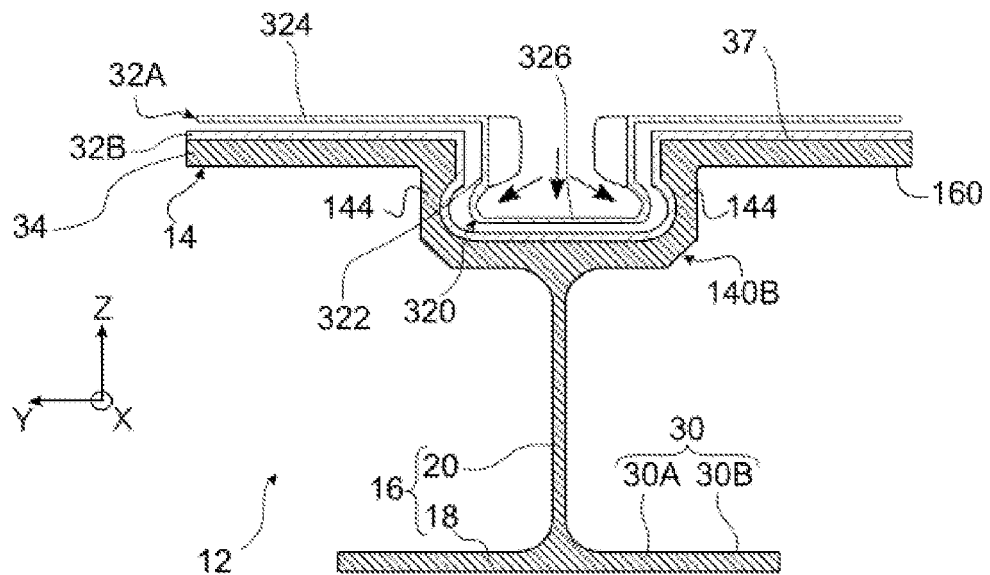
FIG. 11 illustrates a subsequent step in the manufacturing method.

In an embodiment of the disclosure herein, with reference to FIGS. 7 to 11, substep c2 comprises:
c2-i) using a rolling technique, preforming the protective sheet 32A so as to cause it to adopt a shape (FIG. 7) comprising a middle part 320, for example of planar shape at this stage in the method, delimited laterally by two opposite ridges 322 projecting out towards a first side with respect to the middle part and extended respectively by two terminal blades 324 facing one another and extending in the direction of a second side opposite to the first side, for example in a direction orthogonal to the middle part 320; then
c2-ii) cold-forming the teeth 152 and notches 154 in the ridges 322 (FIGS. 9 and 10) using a press-forming technique, which is to say by pressing the already pre-formed protective sheet 32A against a die 330 (FIG. 8); then
c2-iii) bending the protective sheet 32A thus prepared so as to bring the terminal blades 324 into a configuration parallel to a central part 326 of the middle part 320 (FIG. 10); then
c2-iv) applying and fixing the protective sheet 32A thus defined to the upper platform 34 possibly fully or partially covered with the tack coat layer 32B, giving the protective sheet 32A a definitive shape using an elastoforming, namely using a punch made of an elastomeric material of a shape which substantially complements the guideway, technique or using a hydroforming technique, namely by subjecting the protective sheet 32A housed beforehand in the guideway to water under pressure (FIG. 11). In both instances, the pressure (symbolized by the arrows in FIG. 11) applied by the punch or by the water causes the protective sheet 32A to be brought into contact with the upper platform 34 and/or, as applicable, with the tack coat layer 32B.

The terminal blades 324 thus define the upper surface of each of the flange wings 160 of the upper flange 14, whereas the central part 326 of the middle part 320 defines the upper surface of the bottom 142 of the guideway and the ridges 322 define the retaining lips 146.

In other embodiments of the disclosure herein, step A comprises procuring a quantity of the first material to allow subsequent production of the beam 30, and step C comprises preparing the protective sheet 32A, for example by steps c2i to c2iii above, possibly covering—the protective sheet 32A thus prepared with the tack coat layer 32B, then forming the beam 30 by any suitable metalworking process in which the protective sheet 32A acts as die.

Figure 12:
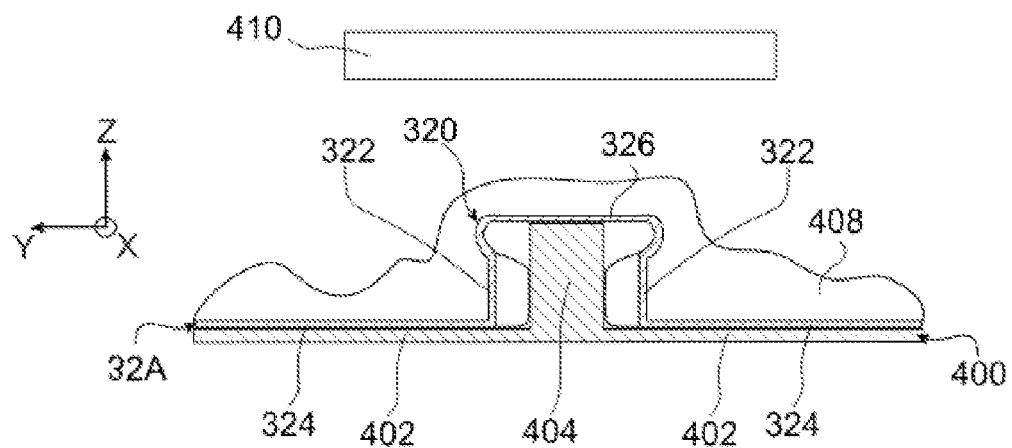
FIG. 12 illustrates a step in a method for manufacturing an anchor rail for an aircraft floor according to another preferred embodiment of the disclosure herein.

Specifically, with reference to FIG. 12, the protective sheet 32A is placed for example, upside down, on a support 400 comprising lateral parts 402 designed to support the terminal blades 324 and a middle part 404 configured to be able to be inserted between the ridges 322 so as to be in contact with the central part 326 of the middle part 320.

If appropriate, the tack coat layer 32B (not visible in FIG. 12) is applied to all or part of the protective sheet 32A.

The first material 408 is then brought by any suitable approach onto the protective sheet 32A, which may have been fully or partially covered with the tack coat layer 32B. The first material, in liquid state for example in the context of a casting method, or in the powder state for example in the context of a compaction method, is then shaped by molding elements and/or press elements 410 (illustrated very schematically) to result in the beam 30.

Furthermore, whatever the type of method employed to create the beam 30, step C may comprise the fitting of one or more anti-corrosion protection bushings 50, in the inset bushing configuration, into the orifices 36 in the upper platform 34.

Where applicable, step C may comprise solidifying the tack coat layer 32B.

Finally, where appropriate, step C may comprise the fitting of one or more anti-corrosion protection bushings 90, in the protruding bushing configuration, in the through-passages 39 of the upper flange 14.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An anchor rail for an aircraft floor, comprising:
an upper flange comprising a guideway configured for anchoring fixing elements, and two flange wings arranged one on each side of the guideway configured to support floor panels; and
a lower stiffening structure connected to the upper flange, and comprising:
   a beam formed at least of a body composed of a first material and defining the lower stiffening structure and an upper platform; and
   an anti-corrosion protection wholly covering an upper face of the upper platform so the anti-corrosion protection and the upper platform together constitute the upper flange of the rail, the anti-corrosion protection being at least formed of a substantially hard and rigid solid metal protective sheet positioned on the upper platform, the protective sheet composed of a second material more resistant to corrosion than the first material and extending continuously from one lateral free end of one of the flange wings to a lateral free end of the other flange wing and by which the protective sheet covers a bottom and two mutually opposite side walls of the guideway.

2. The rail of claim 1, at least one of:
(a) wherein the first material is aluminum or an aluminum alloy; and
(b) wherein the second material is selected from titanium, a titanium alloy, or a stainless steel.

3. The rail of claim 1, wherein the beam comprises an anti-corrosion coating which covers an entirety of the body of the beam, and by which the anti-corrosion coating is interposed between the body of the beam and the anti-corrosion protection at the upper flange.

4. The rail of claim 1, wherein the anti-corrosion protection comprises a tack coat layer interposed between at least part of the protective sheet and at least part of the upper platform of the beam.

5. The rail of claim 1, wherein at least a lateral edge of the upper platform of the beam is protected against the ingress of corrosive fluids between the upper platform and the anti-corrosion protection layer by a sealant arranged:
   either in a space formed between the anti-corrosion protection and the upper platform, as a result of the lateral edge forming a rounded portion at a junction between the upper face of the platform and a corresponding edge face of the platform, or forming a rounded portion over an entirety of an edge face of the platform;
   or in a form of a deposit of material added to a flat edge face formed jointly by the lateral edge of the upper platform and a corresponding lateral edge of the anti-corrosion protection;
   or in a form of a deposit of material which is added to a flat edge face formed at least by the lateral edge of the upper platform and which extends as far as an underside face of a lateral edge of the protective sheet of the anti-corrosion protection which extends as an overhang beyond the flat edge face.

6. The rail of claim 1, wherein the upper platform has at least one lateral edge forming a rounded portion at a junction between the upper face of the platform and a corresponding edge face of the platform, the rounded portion being covered by a turned-over edge of the anti-corrosion protection layer.

7. The rail of claim 1, wherein the upper platform of the beam and the anti-corrosion protection have at least a pair of aligned respective orifices together defining a through-passage extending through the upper flange of the rail for a fastener.

8. The rail of claim 7, comprising an anti-corrosion protection bushing housed at least in the orifice of the upper platform of the beam and delimiting at least a segment of the through-passage.

9. An aircraft floor comprising panels and at least one rail of claim 1 of which the flange wings of the upper flange support the panels.

10. An aircraft comprising at least one aircraft floor of claim 9 and at least one fixing element anchored in the guideway of the rail.

* * * * *